(12) United States Patent
Braun et al.

(10) Patent No.: US 7,167,586 B2
(45) Date of Patent: Jan. 23, 2007

(54) METHOD AND SYSTEM FOR REMOTE FORM COMPLETION

(75) Inventors: John F. Braun, Weston, CT (US); John W. Rojas, Norwalk, CT (US); James R. Norris, Danbury, CT (US); Jean-Hiram Coffy, Norwalk, CT (US); Arthur Parkos, Southbury, CT (US); Alan Leung, New York, NY (US); Wendy Chui Fen Leung, Woodside, NY (US)

(73) Assignee: Pitney Bowes Inc., Stamford, CT (US)

( * ) Notice: Subject to any disclaimer, the term of this patent is extended or adjusted under 35 U.S.C. 154(b) by 572 days.

(21) Appl. No.: 10/065,284

(22) Filed: Sep. 30, 2002

(65) Prior Publication Data

US 2004/0064783 A1   Apr. 1, 2004

(51) Int. Cl.
*G06K 9/46* (2006.01)
(52) U.S. Cl. ...................................... 382/203
(58) Field of Classification Search ................. 382/203
See application file for complete search history.

(56) References Cited

U.S. PATENT DOCUMENTS

| | | | |
|---|---|---|---|
| 1,684,756 A | 9/1928 | Close ........................... 462/67 |
| 3,273,123 A | 9/1966 | Lowitz ........................ 382/202 |
| 4,630,265 A | 12/1986 | Sexton ......................... 370/85 |
| 5,140,645 A | 8/1992 | Whitaker ..................... 382/184 |
| 5,243,149 A | 9/1993 | Comerford ............... 178/18.03 |
| 5,377,332 A | 12/1994 | Entwhistle .................. 395/325 |
| 5,453,762 A | 9/1995 | Ito et al. ...................... 345/179 |
| 5,561,446 A | 10/1996 | Montlick |
| 5,581,682 A | 12/1996 | Anderson et al. ........... 715/530 |
| 5,586,036 A | 12/1996 | Pintsov ...................... 705/408 |
| 5,587,560 A | 12/1996 | Crooks ..................... 178/18.03 |
| 5,612,720 A | 3/1997 | Ito et al. ...................... 345/179 |
| 5,647,017 A | 7/1997 | Smithies et al. ............ 382/119 |
| 5,684,990 A | 11/1997 | Botthby ....................... 707/203 |
| 5,767,496 A * | 6/1998 | Swartz et al. ............ 235/462.1 |
| 5,897,648 A | 4/1999 | Henderson |
| 5,903,667 A * | 5/1999 | Kuzunuki et al. .......... 382/187 |

(Continued)

FOREIGN PATENT DOCUMENTS

JP        2001-43000 A      2/2001

(Continued)

OTHER PUBLICATIONS

McComb et al., "Using WordPerfect 6.1 for Windows", 1994, Daved P. Ewing, Special Edition, p. 395.*

(Continued)

*Primary Examiner*—Joseph Mancuso
*Assistant Examiner*—Jonathan Schaffer
(74) *Attorney, Agent, or Firm*—George M. Macdonald; Steven J. Shapiro; Angelo N. Chaclas

(57) ABSTRACT

The present application describes systems and methods for composing documents using a digital pointing instrument. In further configurations, a user utilizes a pen to partially fill in a form and provide destination data whereby a forms processor adds additionally required information to the form in order to compose a complete form that is sent to the destination.

16 Claims, 3 Drawing Sheets

U.S. PATENT DOCUMENTS

| | | | |
|---|---|---|---|
| 5,974,177 A | 10/1999 | Krtolica | 382/202 |
| 6,009,416 A | 12/1999 | Pintsov | 705/410 |
| 6,050,490 A | 4/2000 | Leichner et al. | |
| 6,081,261 A | 6/2000 | Wolff et al. | 345/179 |
| 6,091,835 A | 7/2000 | Smithies et al. | 382/115 |
| 6,188,392 B1 * | 2/2001 | O'Connor et al. | 345/179 |
| 6,201,903 B1 * | 3/2001 | Wolff et al. | 382/317 |
| 6,208,771 B1 | 3/2001 | Jared et al. | 382/306 |
| 6,229,102 B1 * | 5/2001 | Sato et al. | 178/19.01 |
| 6,259,043 B1 | 7/2001 | Clary | 178/18.01 |
| 6,282,583 B1 | 8/2001 | Pincus | 709/400 |
| 6,307,956 B1 | 10/2001 | Black | 382/124 |
| 6,310,988 B1 | 10/2001 | Flores et al. | 382/313 |
| 6,311,042 B1 | 10/2001 | DeSchrijver | 455/66 |
| 6,327,395 B1 | 12/2001 | Hecht et al. | 382/306 |
| 6,330,976 B1 | 12/2001 | Dymetman et al. | |
| 6,396,598 B1 | 5/2002 | Kashiwagi et al. | 358/474 |
| 6,422,474 B1 | 7/2002 | Gossweiler, III et al. | |
| 6,456,740 B1 | 9/2002 | Carini | 382/187 |
| 6,502,756 B1 | 1/2003 | Fahraeus | 235/494 |
| 6,504,956 B1 | 1/2003 | Gannage et al. | 382/188 |
| 6,548,768 B1 | 4/2003 | Pettersson et al. | 178/18.01 |
| 6,570,104 B1 | 5/2003 | Ericson et al. | 178/18.09 |
| 6,573,887 B1 | 6/2003 | O'Donnell, Jr. | 345/179 |
| 6,577,300 B1 | 6/2003 | Picoult et al. | 345/179 |
| 6,586,688 B1 | 7/2003 | Wiebe | 178/18.09 |
| 6,594,406 B1 | 7/2003 | Hecht | 382/306 |
| 6,609,653 B1 | 8/2003 | Lapstun et al. | 235/375 |
| 6,627,870 B1 | 9/2003 | Lapstun et al. | 250/221 |
| 6,666,376 B1 | 12/2003 | Ericson | 235/454 |
| 6,681,045 B1 | 1/2004 | Lapstun et al. | 382/187 |
| 6,694,045 B1 | 2/2004 | Chung et al. | 382/119 |
| 6,698,660 B1 | 3/2004 | F'hraeus et al. | 235/472.01 |
| 6,773,177 B1 | 8/2004 | Denoue et al. | 400/88 |
| 6,795,060 B1 | 9/2004 | Rekimoto et al. | 345/173 |
| 6,865,284 B1 | 3/2005 | Mahonet et al. | 382/112 |
| 6,895,507 B1 | 5/2005 | Teppler | 726/19 |
| 6,941,510 B1 | 9/2005 | Ozzie et al. | 715/513 |
| 6,970,583 B1 | 11/2005 | Black | 382/124 |
| 6,972,864 B1 | 12/2005 | Lapstun et al. | 358/1.15 |
| 2001/0051890 A1 | 12/2001 | Burgess | 705/9 |
| 2001/0055411 A1 | 12/2001 | Black | 382/124 |
| 2002/0006212 A1 | 1/2002 | Rhoads et al. | 382/100 |
| 2002/0035687 A1 | 3/2002 | Skantze | 713/168 |
| 2002/0054778 A1 | 5/2002 | Ericson et al. | 400/76 |
| 2002/0057824 A1 | 5/2002 | Andreasson | 382/101 |
| 2002/0065042 A1 | 5/2002 | Picoult et al. | |
| 2002/0065101 A1 | 5/2002 | Picoult et al. | |
| 2002/0067854 A1 * | 6/2002 | Reintjes et al. | 382/199 |
| 2002/0078088 A1 | 6/2002 | Kuruoglu et al. | 707/512 |
| 2002/0080386 A1 | 6/2002 | Snowdon et al. | |
| 2002/0107885 A1 | 8/2002 | Brooks et al. | 707/505 |
| 2002/0126105 A1 | 9/2002 | O'Donnell, Jr. | 345/179 |
| 2002/0146170 A1 | 10/2002 | Rom | 382/175 |
| 2002/0169963 A1 | 11/2002 | Seder et al. | 713/176 |
| 2002/0169986 A1 | 11/2002 | Lortz | 713/201 |
| 2002/0193975 A1 | 12/2002 | Zimmerman et al. | 703/6 |
| 2003/0001020 A1 | 1/2003 | Kardach | 235/494 |
| 2003/0046256 A1 | 3/2003 | Hugosson et al. | 707/1 |
| 2003/0133629 A1 | 7/2003 | Sayers | 382/313 |
| 2003/0192000 A1 | 10/2003 | Vail | 714/746 |
| 2003/0214681 A1 | 11/2003 | Bohan | 358/468 |
| 2004/0134690 A1 | 7/2004 | Norris et al. | 178/19.01 |
| 2004/0139391 A1 | 7/2004 | Stumbo et al. | 715/512 |
| 2004/0205545 A1 | 10/2004 | Bargeron et al. | 715/512 |
| 2005/0097337 A1 | 5/2005 | Sesek | 713/186 |
| 2006/0075340 A1 | 4/2006 | Coffy | 715/541 |

FOREIGN PATENT DOCUMENTS

| | | | |
|---|---|---|---|
| WO | WO 02/075629 | * | 9/2002 |

OTHER PUBLICATIONS

Anoto Advertising Booklet—"Uniting Handwriting with the Digital World", undated, 15 pages.

Anoto Advertising Booklet—"Hey, Guess What Those Nifty Swedes Have Dreamed Up Now to Revolutionize Digital Communiction?!", undated, 22 pages.

"A Comparison of Anoto Technology with Other Releeant Systems." Undated. 17 Pages.

Anoto Functionality—World Wide Web pages from www.anotofunctionality.com. Accessed Jan. 29, 2004. 7 pages.

Unknown Anoto, Subsidiary of C Technologies, Initiates Collaboration with John Dickinson, UK's Leading Producer of Stationary Products, Apr. 23, 2001, Business Wire, 2 pages.

* cited by examiner

FIG. 2A

| 200 AIRBILL | 201 |
|---|---|
| SOURCE 202 | DESTINATION 204 |
| ITEM INFORMATION 206 | DELIVERY OPTIONS 208 |
| PAYMENT 210 | SIGNATURE 212 |
| FORM RETURN ADDRESS 214 | 216 218 220 / 222 |

FIG. 2B

| 230 AIRBILL | 231 AIRBILL # 233 BARCODE |
|---|---|
| JOHN DOE INC NY, NY 00000 232 | JANE DOE INC NY, NY 00000 234 |
| ITEM DATA 236 | DELIVERY DATA 238 |
| PAYMENT DATA 240 | SIGNATURE DATA 242 |

FIG. 3A

250 SALES WORKSHEET 251

CUSTOMER 252 DATA

254

ITEM #  DELIVERY DATE

256

257 DOCUMENT TYPE

| CONTRACT | 258 |
|---|---|
| FIRM QUOTE | 259 |

DOCUMENT RETURN ADDRESS 260

280 SALES CONTRACT 281

CONTRACT TEXT 282

CONTRACT TEXT

CONTRACT TEXT

CONTRACT TEXT

~~CONTRACT TEXT~~ 284

*NEW CONTRACT TEXT* 286

SIGNATURES 288                                290

METHOD AND SYSTEM FOR REMOTE FORM COMPLETION

BACKGROUND OF INVENTION

The illustrative embodiments disclosed in the present application are useful in systems including those for processing forms and more particularly are useful in systems including those for processing forms using remote form completion and delivery.

Traditional paper based forms are used in many situations. Typically, a form will include pre-printed information and pre-printed boxes for data input. Such a traditional form might be filled in be a salesman in the field. In such a situation, a salesman would fill in some information on the form and send the form to a central processing location by mail or facsimile. The data on the form would typically be scanned or keyed in by an operator. In another example of a use of a pre-printed form, airbill systems typically utilize a pre-printed form.

In using a traditional pre-printed form, the user fills in data input spaces using an ink pen. The form is then sent for processing. Accordingly, the user may not be able to ascertain required information and may submit a partially filled in form.

A reference entitled method and apparatus for wireless remote information retrieval and pen-based data entry is shown in U.S. Pat. No. 5,561,446 issued Oct. 1, 1996 to Montlick and is incorporated herein by reference. The reference describes a system for designating a recipient of a facsimile using strokes made with a pen.

SUMMARY OF INVENTION

The present application describes illustrative embodiments of systems and methods for generating documents such as by completing forms. In further illustrative embodiments, a user utilizes a pre-printed form and digital pen to remotely create a document. In a further illustrative embodiment, the user utilizes the pre-printed form to provide a delivery indication that is used in delivering a completed form that is completed using data entered by the user remotely on a pre-printed form.

BRIEF DESCRIPTION OF DRAWINGS

FIG. 2A is a schematic representation of a pre-printed form according to an illustrative embodiment of the present application.

FIG. 2B is a schematic representation of a completed form according to the illustrative embodiment of the present application shown in FIG. 2A.

FIG. 3A is a schematic representation of a pre-printed form according to another illustrative embodiment of the present application.

FIG. 3B is a schematic representation of a completed form according to the illustrative embodiment of the present application shown in FIG. 3A.

DETAILED DESCRIPTION

Figure 1:
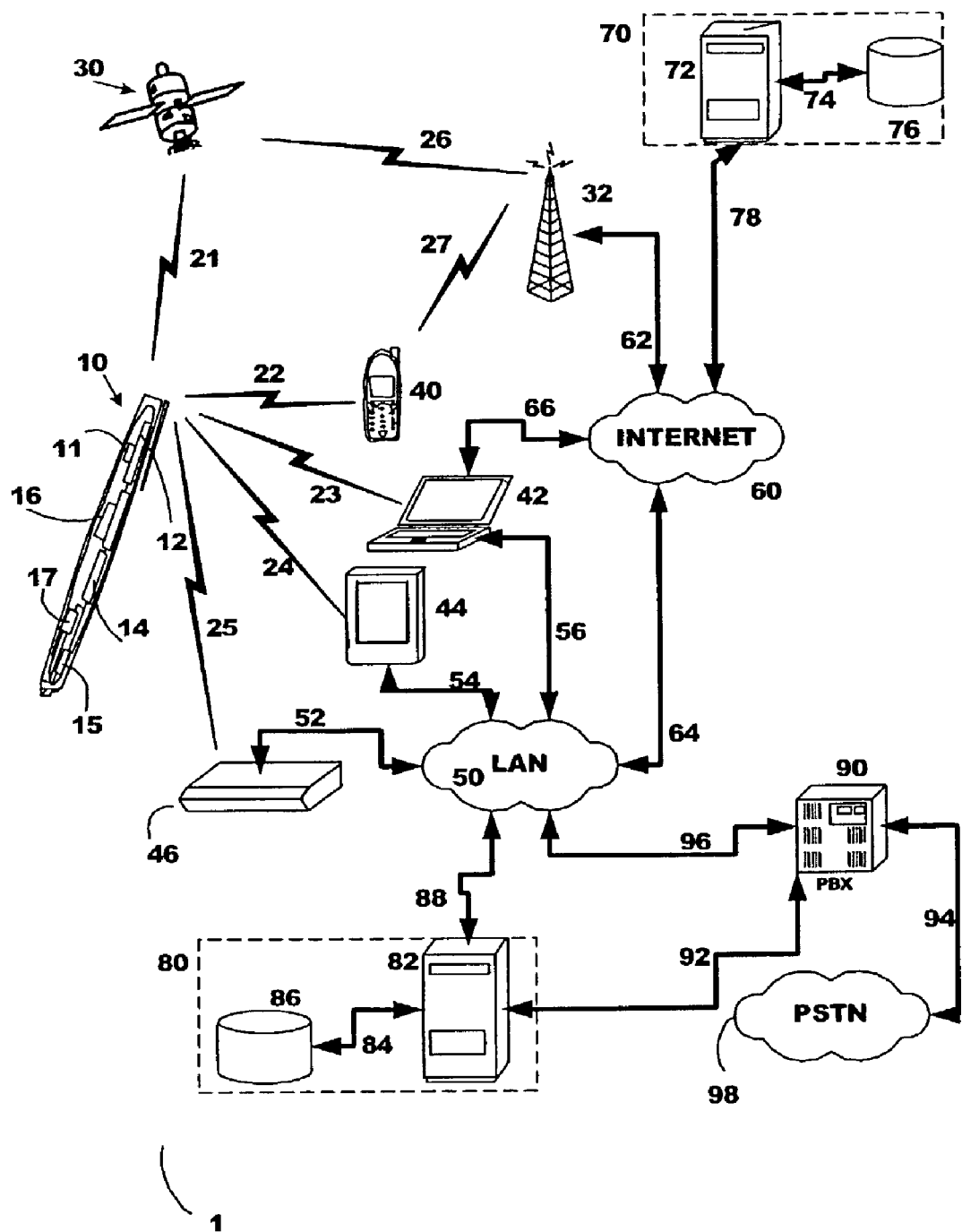
FIG. 1 is a schematic representation of a digital pen document generation system according to an illustrative embodiment of the present application.

A method and system for generating documents is shown. In an illustrative embodiment, a system and method for using a digital pen to input data using a pre-printed form and indicate a delivery destination for the completed form. In one embodiment, a digital pen and pre-printed pattern is used to determine data.

Digital pointing devices such as the pen and tablet systems available from Wacom Technology Corp. of Vancouver, Wash. allow a user to utilize a computer to capture pen strokes that the user traces over a tablet. Digital pointing devices may utilize capacitive sensors or other grid based sensors to determine absolute or relative position of the pointing device.

Digital pens allow a user to capture or digitize handwriting or pen strokes that the user writes on a medium such as a piece of paper by using a processor such as a personal computer. Certain digital pens utilize an imaging device to scan or record an image of the pen stroke. Certain other digital pens use mechanical sensors in order to record a pen stroke. The pen systems may utilize positioning systems such as light-based scanning systems including infrared (ir) sources and detectors in order to determine an absolute or relative position of the pen. Digital pen systems include the N-Scribe system available from Digital Ink of Wellesley, Mass. and the E-Pen system available from E-Pen In Motion of Matam, Haifa Israel. A digital pointing device includes the V-Pen system available from OTM Technologies of Herzliya Israel.

Another digital pen system is the Sony-Ericsson CHA-30 Chatpen and Anoto paper available from Anoto AB of Sweden. The Chatpen utilizes a Bluetooth transceiver in order to communicate with a processor and the Anoto paper includes a grid encoding information such position information that is detected by the Chatpen. Additional information may be captured including information related to pressure, speed and pen attitude. The additional information includes biometric information that may be used to identify or authenticate a user.

A reference describing a handheld writing device is shown in U.S. Pat. No. 6,050,490, issued Apr. 18, 2000 and is incorporated herein by reference.

Commonly owned, co-pending U.S. patent application Ser. No. 09/727,893 and filed Nov. 30, 2000 describes systems for remote retrieval of messages and is incorporated herein by reference.

Commonly owned, co-pending U.S. patent application Ser. No. 09/707,561, filed Nov. 7, 2000 describes systems for remote retrieval of documents and is incorporated herein by reference.

Commonly owned, co-pending U.S. patent application Ser. No. 09/728,237, filed Nov. 30, 2000 describes systems for remote printing of documents and is incorporated herein by reference.

Co-pending U.S. patent application Ser. No. 10/065,281, entitled Method And System For Creating And Sending a Facsimile Using a Digital Pen, filed on even date herewith, is incorporated by reference in its entirety.

Co-pending U.S. patent application Ser. No. 10/065,282, entitled Method And System For Creating a Document Having Metadata, filed on even date herewith, is incorporated by reference in its entirety.

Co-pending U.S. patent application Ser. No. 10/065,283, entitled Method And System For Identifying a Form Version, filed on even date herewith, is incorporated by reference in its entirety.

Co-pending U.S. patent application Ser. No. 10/065,285, entitled Method And System For Identifying a Paper Form Using a Digital Pen, filed on even date herewith, is incorporated by reference in its entirety.

The Digital Pen

The present application describes systems and methods for composing documents using a pointing device. The illustrative embodiments described herein utilize a digital pen in order to compose a document and indicate delivery information for a completed document. However, other sensing devices may be utilized to compose other documents.

The digital pen is utilized to capture information regarding the pen strokes made by a user. In the illustrative embodiments described herein, a Chatpen and Anoto paper is described. Toolkits available from Anoto AB are utilized to process stroke data and also biometric data including stroke data. Document generation is accomplished using Word and VBA available from Microsoft of Redmond, Wash. Additionally, development tools and customizable applications available from Microsoft may be utilized. Alternatively, document generation is accomplished utilizing a host based document generation system.

However, other digital pens may also be utilized. Certain digital pens utilize position determination be determining the actual location of the pen on a piece of paper in order to provide a relative location in terms of the location in the space of the piece of paper. Certain digital pens scan the ink as it is applied to digitize a stroke while others sense the stroke using sensors such as pressure sensors, Doppler sensors, accelerometers and other sensing mechanisms.

The Chatpen and Anoto paper provide a pen that writes using ink on paper printed with an Anoto pattern. The Chatpen includes a sensor to detect the Anoto pattern. The detected pattern identifies the relative pen location on a grid of the pattern using a pattern look-up processor that may be locally or remotely resident. The relative location allows the pen stroke and pattern look-up processor to determine where the pen is on a defined logical space of the pattern. Certain logically defined two-dimensional areas of the pattern may be defined as representing certain functions. For example, Anoto paper may be printed with a box that includes a particular portion of the pattern that is attributed the meaning of "Send Form." The Anoto pattern may be utilized to determine the type of pre-printed form being utilized and the company that should receive the data. The media may be printed with an indication to the user that such box has been attributed that meaning or that portion of the pattern may be used in a box that is mandatory for an order sheet such as the "Item:" number field as used by a salesman in the field. The form may be preprinted with the format of a sales contract or may include input data fields that will be used to compose a sales contract.

Using the Chatpen, the stroke, biometric and pattern position information is sent to the pen stroke processor via a wireless Bluetooth TM communications channel that is secure across a personal area network. A pattern lookup processor may be local to the document composition processor or may be remotely linked via a communications channel such as the Internet. As shown herein, a completed document or form is composed and delivered according to strokes made on a pre-printed form. As can be appreciated, the pre-printed form resembles a traditional pre-printed form such as a sales contract or airbill. The pointing device such as the Chatpen digital pen is used to enter data into the form along with completed document delivery information. The document composition processor may then determine if additional information is required and then complete the document or form and deliver it to the user using the provided document delivery information. The user may be a salesman in the field at a customer location and the salesman may have the authority to send a document to the facsimile machine at the customer site.

The illustrative embodiments describe methods and apparatus for capturing pen strokes, input data such as commands. Additional methods and apparatus for composing and receiving the documents are described. The processes and apparatus described may be implemented using hardware, software or a combination of both. The communications channels may be wireless or wired and may utilize security techniques such as encryption. The data storage and data processors may be locally or remotely located.

The Document Composition System

Referring to FIG. 1, a first illustrative embodiment describing a digital pen document composition and delivery service system 1 is shown.

Digital Pen 10 includes a processor 14, memory 12, ink 17, a camera or image sensor 15, a battery 16 and a wireless transceiver 11. It also includes biometric sensors (not shown). In an alternative, the ink 17 is machine detectable. In another embodiment, the ink is invisible.

The pen 10 includes a pen tip (not shown) that writes using the ink 17. Writing sensors (not shown) provide data regarding the stroke such as pressure, speed and pen attitude.

In one embodiment, the digital pen is a Chatpen using a Bluetooth TM transceiver. Bluetooth TM utilizes several layers of security. At a link level, remote/local device authentication is required before any communication can take place. At the Channel level, a link level connection occurs and then the devices need to authenticate before a communications channel is established. Additionally, the data payload being transmitted may be encrypted. In this embodiment, appropriate security at several protocol layers is utilized including the application layer.

In an alternative, the pen includes audio input/output including synthesized voice output and voice recognition. Visual output is provided using an LCD display and LEDs and tactile feedback is provided using servomechanisms. Physical input includes an input button.

The embodiments described herein may utilize biometric data for purposes including identification and authentication of a user. In this embodiment, the digital pen 10 is a Chatpen digital pen available from Anoto, AB. The pen 10 provides biometric data relating to the pen strokes used including hand speed, pen tip pressure and the inclination angle between pen and paper. Such data is referred to herein as BIODATA. In alternative embodiments, the BIODATA may include other biometric data such as a retinal scan or fingerprint scan performed using an external processor such as laptop 42 that is co-located with the pen or by the pen 10. The pen 10 is assigned a unique identification code that is a unique serial number for the pen. In an alternative, the PUID is a Bluetooth TM MAC code or other unique or group assigned code.

The system 1 includes at least one pen 10 that establishes a personal area network using Bluetooth TM. The paired device may be a Bluetooth TM router 46 that connects to the digital pen 10 using wireless connection 25 and provides a gateway using communications connection 52 to a system LAN 50 or to the Internet 60 (connection not shown). The paired device may include a wireless capable PDA 44 that has a Bluetooth connection 24 and a connection 54 to the LAN 50. Similarly, the digital pen 10 may connect using wireless connection 23 to laptop 42 that is connected to the LAN 50 by connection 56 and the Internet 60 using connection 66.

In an example that is useful for salesmen without access to a LAN connected device, the digital pen 10 may be paired with cellular telephone 40 using connection 22. The cellular telephone 40 is connected to cellular base station 32 using connection 27. Additionally, the digital pen may send or receive signals using satellite 30 using channel 21. The signals may include GPS or other signals. The satellite may be connected to a communications network such as the cellular system using connection 26.

Here, the system 1 includes a server 80 that includes storage 86 connected by connection 84 to processor 82. The server 80 is connected to the LAN 50 using communications channel 88. The server may also be connected directly to the Internet (connection not shown). Here, the server hosts a document composition process that may be used to receive input data from the pen 10 and recognize the form being used in order to store the data sent by the user and also to compose a completed document by adding any required information to compose a completed form. The server 80 and the document composition process utilize information sent from the user that utilizes pen 10 to indicate a destination location for the composed document. For example, a salesman in the field could fill in a form and indicate a destination facsimile number. The form may be partially completed and the document composition process may complete the form. Additionally, the user may rely upon a default destination such as the email address of the salesman that the salesman could access using a computer at the customer site. The Chatpen is used to authenticate the user and verify access to the form, any additionally required data and the document composition process.

The server 80 contains an email server in order to send composed documents by email when indicated. The server 80 is also connected to a Private Branch Exchange (PBX) 90 using connection 92. The PBX 90 is connected to the Public Switched Telephone Network 98 (PSTN) using connection 94 that may be a T1 line. The PSTN is the telephone network used to transmit facsimile messages. The PBX 90 is also connected to LAN 50 using connection 96 and is accessible to the devices such as the gateway 46, PDA 44 and Laptop 42. The cellular system 32 is also connected to the PSTN 98 (not shown). Here the document composition process may utilize the PSTN connection to deliver the composed document or filled in form by facsimile. As can be appreciated, other communications server may be utilized to deliver composed documents to a destination including ftp or other protocols using IP addressable sites over the Internet.

Furthermore, server 70 is connected to a network such as the Internet 60 using connection 78. Server 70 includes processor 72 connected to storage 76 using connection 74. Here, the Anoto pattern lookup service may be remotely located and may be accessed while determining pen location and other pattern lookup related data.

The system 1 provides several security options including having biometrics data stored for comparison in a database on a secure server 80.

The Handheld processor 44 is a PDA including a docking cradle or wireless connection for access to a LAN 50. Coarse position information regarding the location of digital pen 10 can be determined by locating the paired device such as cellular telephone 40 that can be located by triangulation if transmitting. Other known positioning systems may also be utilized.

Cellular telephone 40 is connected to cellular operator system 32. The cellular telephone could simply provide a data link such as a GSM link. In an alternative, the cellular telephone could include additional processing capacity and be used to capture and/or manipulate data. Corporate LAN 50 is connected to the Internet 60 using T1 line 64. Alternatively, the connections could be over private lines or may be a Virtual Private Network. It is contemplated that all of the connections utilize appropriate security measures.

Other well-known input devices, servers, processors, networks and communications mechanisms may be used. A back-end application may be utilized to process pen strokes. The back end application then recognizes command strokes or strokes in command locations identified by the pattern. The data written by a user in a particular data input flied can be rasterized and then subjected to Optical character recognition (OCR) in order to identify the data written by the user.

Laptop 42 utilizes a mobile Pentium 4 processor and Windows XP. The server processors are geographically and load balanced application servers using systems available from Sun Microsystems and the storage servers use multiple location redundant backup systems. Additionally, other appropriate wireless and wired networks and connections may be utilized. It is contemplated that other communications channels such as OC-3 lines or wireless connections could be used in place of the T1 lines. Similarly, the other communications channels could be replaced with alternatives. As can be appreciated, various communication flows may be utilized, some of which will be chattier than others. Laptop 42 could also provide gateway access to the TCP/IP Internet network.

The present embodiment may alternatively use any pen or stylus like device that provides for electronically recording strokes. Position information may be processed into strokes or transmitted in a separate data stream.

The digital pen 10 approximates the size of a traditional pen and may be used by a user to handwrite information. The digital pen may detect pattern information that may be relayed to a pattern lookup server 70 across the Internet 60. Responsive information may then be sent back to the message processor.

Here, the co-located processor 44, 42, 40 or remote processor 82 may receive pen data including stroke data, pattern data and other input data.

Transmitter/receiver 11 transmits and receives signals to and from the paired base unit 40, 42, 44, 46 that provide a communications link for sending pen data that is used by the message processor to compose and send a message such as a facsimile message.

The document composition processor can be implemented in the local co-located processor being used such as 40, 42, 44 or in a remote processor such as 72 or 82. The document composition process may include processes such as pen stroke input processing, form and command processing and form completion and communications processing. In an alternative, pen 10 and the document composition processor provide handwriting recognition. The document composition processor may include handwriting recognition or may employ a limited set of symbol recognition for command processing. Using the Anoto pattern lookup, the system may rely on the pattern to determine commands rather than be recognizing strokes.

Referring to FIGS. 2A and 2B, a schematic representation of a source form and completed form according to an illustrative embodiment of the application is shown. Here, the preprinted form 200 is an airbill form used for a delivery service. The airbill form 200 has an Anoto pattern 201 on the form. Section 202 of the form is a source box that a user may utilize to input a source entity and address. The document or form composition system may utilize the identifier of pen 10 or user information to identify the source information. Additionally, the user may input some source information such as a mail stop code or user name or client account while relying on the form composition system to provide the rest of the source data.

The destination address section 204 may include a complete address or a customer identifier such as a customer number. Additionally, if a customer identifier is utilized, additional destination information such as the mail stop or direct recipient name may be input. Item information section 206 may include weight and packing information for the item. Delivery options section 208 may include delivery option check boxes such as Saturday delivery.

A payment section may provide space for user input of payment data 210 including actual payment data such as an account number or credit card number or charge back information. Alternatively, the form identification, user identification or user authentication information (including biometric information) may be utilized to determine payment source data and authorize payment. Furthermore a signature section 212 may be used to authenticate a user. In an alternative, the system may be configured to recognize pre-stored signature patterns and check box inputs only while simply copying other handwritten data verbatim into the destination form. Finally, the form 200 includes a return address box 214 for indication destination information. Check boxes could be used to indicate pre-stored destinations be used. For example, box 216 could indicate mail to the customer destination on file for the customer number entered. Box 218 could indicate facsimile transmission and box 220 could indicate email transmission. The user may input an email address in box 214 and then check box 220. Similarly, other input addresses or identifiers for addresses may be input in box 214. Box 222 could be used as an abort process indication input section.

FIG. 2B shows the completed form 230 in which the form composition process has received pen input from a user and composed a form using additional information such as the airbill # and barcode 233 that the process assigned to that form. Here, the data from source 202 is used verbatim or used to derive source data 232 that is printed in the completed form 230. The completed form may also contain the Anoto pattern 231. Similarly, the destination data 234 is transcribed or determined from the input in 204. The item data 236 is transcribed or determined from the input in 206. The delivery data 238 is transcribed or determined from the input in 208. The payment data 240 may indicate the actual charges if they differ from the data input in 210 and may provide only charge back information if desired for privacy. Similarly, the signature data 242 may include transcribed or derived information from the input in 212. The processor then uses the destination indication information to send the completed form as indicated by the user.

Here, processor 82 is used to determine additional data to be added to the form such as the airbill number and barcode. Additionally, the processor uses input data such as a customer number to determine address information. The form is completed and composed at the server 82 using input from the user in a remote location using digital pen 10.

In an alternative, another digital pen system is utilized and another pen position system is utilized to capture pen strokes that do not utilize a preprinted pattern.

In an alternative, the source form and destination form are identically formatted such that the data entered on the preprinted form and only the information written on the source form is placed into the destination form format during the composition process. The user inputs a destination address by writing an address on another piece of paper or otherwise indicating a destination address.

Referring to FIGS. 3A and 3B, a schematic representation of a source form and completed form according to another illustrative embodiment of the application is shown wherein the source form contains a different format than the destination form. Sales worksheet 250 includes an Anoto pattern 251 that may be pre-printed. The user uses digital pen 10 to input customer data in section 252 and items to be sold in fields 256 as identified by pre-printed sections headings 254. The user then selects the type of destination document in section 257 and may also input customization data in fields 258, 259 in order to determine which contract template to use or which template pricing scheme or discount scheme to utilize. The document-return information is entered on the form using fields 260, 262, 264, and 266 as shown above. A check box in field 262, 264 or 266 could be used as a send form indication and an abort indication box (not shown) may be provided.

In this embodiment, the form composition processor uses input data and destination indications to compile a sales contract 280 with Anoto pattern 281 containing contract text 282, a signature box 288 and a revise indication box 290. Here, the user may change the contract text using deletions 284 and additions 286. The user may then select the revise button and the form composition processor will revise and resend the form.

In this embodiment, the signature box 288 could be utilized to automatically enter the contracted items into a production or delivery processing system.

Figure 4:
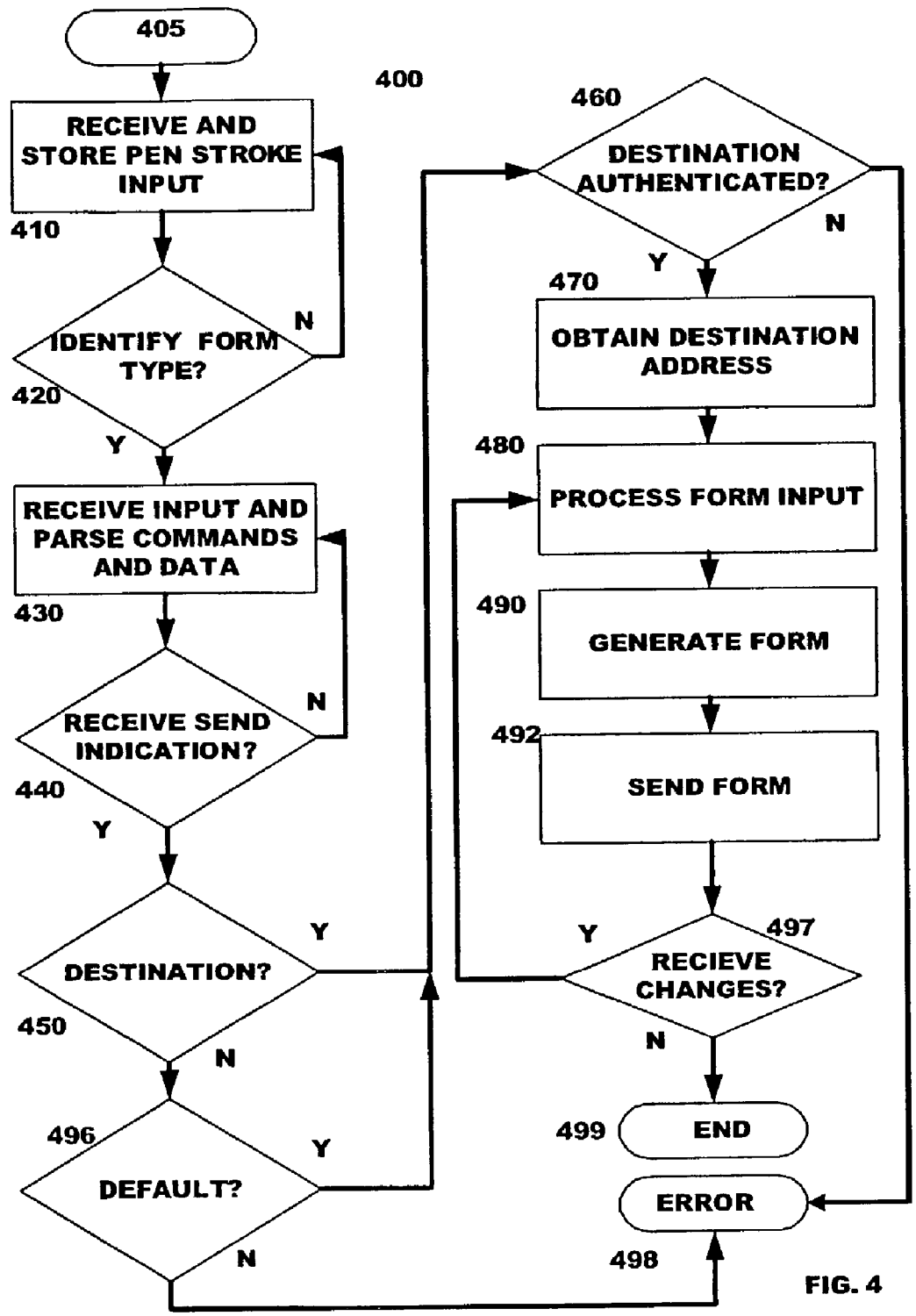
FIG. 4 is a flow chart showing a process for generating a document.

Referring to FIG. 4, a process for composing a document is described. The process beings in step 405 and the message processor receives and stores pen stroke input data in step 410. Here, the pen stroke data may be a data feed in the wireless channel or data sent from a paired device such as a cellular phone that stores some stroke data and then communicated through the Internet to a form processor. In step 420, the form process 400 determines the type of form and loads any custom data for that form needed to parse the input stream. If the form is identified, the process proceeds to step 430 to parse the input and any commands and data. The input process continues until a send indication is received at step 440. In 450, the message process determines if a destination has been indicated. This may be accomplished in the send indication. If there is no destination indication, the process checks in step 496 for a default destination. If there is one, the process reenters the form process flow before 460. If not, an error is processed in 498.

If the destination is indicated, it is authenticated in step 460. If it cannot be authenticated (not on an approved list, etc.), the form process 400 processes an error at 498. In 470 the actual destination address is determined and the form input data and command stream is processed in 480 and the form is generated in 490. Known development systems such as C++ or Word and VBA may be utilized. The Anoto toolkit may be utilized. The form is sent in step 492 and 497 checks for any revisions from the user. If there are no revisions, the process ends in 499. If there are revisions, the process loops back to step 480 to process the revision input stream. The user input data may make an ambiguous reference to additionally required data. In such a case, the first form sent may include two or more choices that are to be selected by the user in a revision process as described above.

The authentication data may be used to ensure that only authorized users have access to the forms and data.

In an alternative applicable to any of the embodiments described, the form processor can use the pen stroke data and pen identification data to determine if the salesman or user has authority to use the particular form, to deal with the particular client, or to sell the particular items requested.

In an alternative embodiment, a digital pen using position sensors similar to those used in a graphics drawing tablet is utilized. In this alternative, the media is defined as a template based upon position. The template could be stenciled on to the media such as a label or envelope in order to aid the user in proper placement of the data. The processor that is processing the data input into the template could offer a user a template selection to choose from, each with its own data location template definition. In another alternative, the template form identifier is placed in machine or human readable form on the media. The digital pen is then used to read the form identifier using a scanning technique or by the user tracing over the form number.

In another alternative embodiment, other biometric data may be utilized. For example, the digital pen 10 may be paired with an external processor such as a PDA such that a shared secret is provided to the pen 10 and the PDA 50. In one alternative, the user does not type in a device PIN for pairing, but a central data system uses unique identifiers such as MAC codes to pair devices. Thereafter, the PDA could also be used to capture biometric data related to a user. In an alternative, the user is authenticated using a customer number and password. Alternatively, the user could be authenticated using biometrics and the pen could be authenticated using its unique Bluetooth 48 bit MAC address.

In an alternative, selection boxes for profiles may be provided. For example, a user may have a profile for contract and a profile for quotations. The profile may include template text to add to the message and may include style commands to dictate how the data is processed.

In another embodiment, a digital pen uses paper that is not preprinted as a form. The user writes a command on the paper that is interpreted by a form processor. For example, the user writes ">chip sales form: Bob"and ">sell: 50 new processor chips, net 30, 1 week lead." Here, the form processor is used to parse the command to determine that a form is being composed and is to be sent to Bob. The form processor authenticates the user and searched a database of potential recipients. If Bob unambiguously defines a single or group recipient, the form processor expands the destination data into a form. The form processor also parses the other commands and appropriately composes the destination form.

In another embodiment, the digital pen includes a pen stroke processor, a form and command processor and a communication processor including an analog cellular modem such that the digital pen includes the entire system for composing and sending a form by accessing a remote database for any additionally required information.

In any of the described embodiments, error indications or messages may be communicated using LED indicators, a display such as an LCD display or audio indications such as beeps or synthesized speech using a speaker. Additionally, tactile feedback may be utilized to indicate an error condition or provide other feedback such as an indication that a form was successfully sent.

In any of the described embodiments, the user may wish to receive a receipt that can be traced back to the originally written form that the user wrote and sent. In the embodiments described above, the composed form may be saved as a record of the form sent and may be stored with a received receipt. Here, the user may want to correlate the original writing with the version sent. In this embodiment, the rasterized image is stored and used to identify the source writing. In another embodiment, the user writes a command for an identification value that is used to identify the source writing. In yet another alternative, a digital signature is developed for the original writing and it is sent with the destination form. In another alternative, the user may send a digital signature that is used to authenticate the form. Here, the biometric data from the pen strokes is used with the key of the user to provide non-repudiation of the form.

In another alternative applicable to any of the embodiments, Wi-Fi enabled wireless systems are utilized and the external processor comprises a Wi-Fi capable hand-held pocket PC such as the Toshiba e740 Pocket PC. Furthermore, differing types of processors and logic systems may be supported. For example, JAVA based PALM OS devices may be utilized. The message logic, processing logic, security logic, user interface logic, communications logic and other logic could be provided in JAVA format or in a format compatible with individual platforms such as Windows CE and PALM OS. Similarly, other portable computing devices such as laptop computers and tablet computers and wireless capable computers could be utilized. Other platforms such as those using Symbian OS or OS-9 based portable processors could be utilized.

In another alternative applicable to any of the embodiments, authentication procedures utilize a token controller having a secure token key storage such as an iButton® available from Dallas Semiconductor in which an attack, for example, a physical attack on the device, results in an erasure of the key information. Passwords may be used, such as a password to access the device. In an alternative, the password may include biometric data read from a user. Alternatively, other secret key or public key systems may be utilized. Many key exchange mechanisms could be utilized in conjunction with a public/private key system for encryption and authentication.

The present application describes illustrative embodiments of a system and method for composing documents using a pointing device and in one embodiment describes a digital pen system for composing and sending a completed form to a destination indicated by the user using the digital pen. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for composing a document comprising:
   receiving captured strokes made by a user with a pointing instrument on an input form that include indications of data including document type data, form input data and command data;
   processing the strokes in order to determine destination indication data;

processing the strokes in order to determine input data, and composing the document using the document type data to select the form of the document from a selection of at least two different form types, wherein the input form comprises a different format than the document and using the input data to populate the document; and sending the document to a destination.

2. The method of claim 1 wherein the pointing instrument is a digital pen and strokes are provided by a user writing on a media having a pattern.

3. The method of claim 2 further comprising:
capturing user authentication information related to the user.

4. The method of claim 3 wherein:
the user authentication information includes biometric data.

5. The method of claim 4 wherein:
the biometric data includes pen stroke data including stroke pressure, stroke speed and pen attitude.

6. The method of claim 2 wherein the command data includes an indication of a send form data command.

7. The method of claim 6 wherein the send form data command is indicated by the user writing a stroke in a segregated field of the media.

8. The method of claim 2 further comprising:
determining a template for the form using the strokes and the pattern, wherein the template determination utilizes the pattern.

9. The method of claim 5, further comprising:
determining additionally required data; and
revising the form.

10. The method of claim 9, further comprising:
determining additionally required data using the input data;
determining ambiguous additionally required data; and
revising the form to include at least two versions of the additionally required data.

11. The method of claim 10, further comprising:
receiving choice data from the user;
revising the form in response to the choice data; and
sending the revised form using the destination indication data.

12. A system for composing a document comprising:
a processor;
a storage device connected to the processor;
the storage device storing a logic program;
the processor operative with the logic program to perform:
receiving captured strokes made by a user with a pointing instrument on an input form that include indications of data including document type data, form input data and command data;
processing the strokes in order to determine destination indication data;
determining a template for the form using the strokes and the pattern;
processing the strokes in order to determine input data;
composing the document using the document type data to select the form of the document from a selection of at least two different form types, wherein the input form comprises a different format than the document and using the input data to populate the document;
sending the document to a destination;
processing the strokes in order to determine a recipient designated by the strokes;
capturing user authentication information related to the user; and
wherein the command data includes an indication of a send form input data command.

13. The system of claim 12 wherein:
the user authentication information includes biometric data.

14. The system of claim 13 wherein:
the biometric data includes pen stroke data including stroke pressure, stroke speed and pen attitude.

15. The system of claim 14 wherein the data includes an indicator of additionally required data, further comprising the processor operative with the logic program to perform:
identifying the additionally required data; authenticating the user using the user authentication information; and verifying user permission to access the additionally required data.

16. The system of claim 15, further comprising the processor operative with the logic program to perform:
determining additionally required data; and
modifying the form using the additionally required data.

* * * * *